United States Patent
Kim et al.

(10) Patent No.: US 10,093,347 B2
(45) Date of Patent: Oct. 9, 2018

(54) MOTOR DRIVEN POWER STEERING SYSTEM AND METHOD OF CONTROLLING THE SAME

(71) Applicant: HYUNDAI MOBIS CO., LTD., Seoul (KR)

(72) Inventors: Cheon Kyu Kim, Seoul (KR); Ji Hoon Yoo, Yongin-di (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/377,069

(22) Filed: Dec. 13, 2016

(65) Prior Publication Data

US 2017/0166245 A1 Jun. 15, 2017

(30) Foreign Application Priority Data

Dec. 14, 2015 (KR) .................... 10-2015-0178103

(51) Int. Cl.
*B62D 5/04* (2006.01)
*B62D 6/02* (2006.01)
*B62D 6/10* (2006.01)
*B62D 15/02* (2006.01)

(52) U.S. Cl.
CPC ........... *B62D 5/0463* (2013.01); *B62D 5/049* (2013.01); *B62D 5/0484* (2013.01); *B62D 6/02* (2013.01); *B62D 6/10* (2013.01); *B62D 15/021* (2013.01)

(58) Field of Classification Search
CPC ....................................................... B62D 5/04
See application file for complete search history.

(56) References Cited

U.S. PATENT DOCUMENTS

| | | | | |
|---|---|---|---|---|
| 5,473,539 A * | 12/1995 | Shimizu | ............... | B62D 5/0463 180/446 |
| 6,370,459 B1 * | 4/2002 | Phillips | ............... | B62D 5/0436 180/443 |
| 7,177,745 B2 * | 2/2007 | Tsuchiya | ............... | B62D 5/0466 180/446 |
| 8,050,825 B2 * | 11/2011 | Ikeda | ............... | B62D 5/0463 180/446 |
| 8,554,417 B2 * | 10/2013 | Yu | ............... | B62D 5/0472 180/443 |
| 2004/0182626 A1 * | 9/2004 | Katou | ............... | G01L 5/221 180/226 |

(Continued)

FOREIGN PATENT DOCUMENTS

KR 10-2008-0078428 A 8/2008

*Primary Examiner* — Adam D Tissot
*Assistant Examiner* — Alex C Dunn
(74) *Attorney, Agent, or Firm* — Knobbe Martens Olson & Bear LLP

(57) ABSTRACT

A motor driven power steering system may include: a steering angle sensor configured to sense a steering angle of a steering wheel; a motor current sensor configured to sense a current of a motor; an encoder configured to sense a position of the motor; a vehicle speed sensor configured to sense a speed of a vehicle; a virtual torque estimation unit configured to estimate, when an error of a torque sensor is detected, a virtual torque using the position of the motor, the steering angle of the steering wheel, and the current of the motor; and an assist torque calculation unit configured to calculate an assist torque for operation of the motor using the steering angle of the steering wheel, the speed of the vehicle, and the virtual torque.

12 Claims, 6 Drawing Sheets

(56) References Cited

U.S. PATENT DOCUMENTS

| | | | |
|---|---|---|---|
| 2013/0261894 A1* | 10/2013 | Kojima | B62D 5/0463 |
| | | | 701/41 |
| 2015/0226627 A1* | 8/2015 | Kuwahara | B62D 5/049 |
| | | | 701/41 |
| 2016/0046320 A1* | 2/2016 | Takahashi | B62D 5/04 |
| | | | 180/446 |
| 2017/0166243 A1* | 6/2017 | Sugawara | B62D 5/0463 |

* cited by examiner

मोटर DRIVEN POWER STEERING SYSTEM AND METHOD OF CONTROLLING THE SAME

CROSS-REFERENCES TO RELATED APPLICATIONS

The present application claims priority to Korean application number 10-2015-0178103, filed on Dec. 14, 2015, which is incorporated by reference in its entirety.

BACKGROUND OF THE INVENTION

The present invention relates to a motor driven power steering system and a method of controlling the same, and more particularly, a motor driven power steering system which can be normally operated even when an error occurs in a torque sensor, and a method of controlling the same.

Examples of a power assistance steering system for reducing steering force required of a driver when steering a vehicle include a hydraulic power steering system which uses hydraulic pressure formed by a hydraulic pump to assist with the steering force of the driver, and a motor driven power steering system (hereinafter referred to as an 'MDPS') which uses the drive torque of an electric motor to assist with the steering force of the driver.

The MDPS functions to assist with the steering force resulting from steering wheel manipulation of the driver in such a way that the electric motor is automatically controlled depending on driving conditions of a vehicle. Therefore, the MDPS provides further enhanced steering performance and steering sensation, compared to the hydraulic power steering system.

Such an MDPS senses a vehicle speed, a steering angle and a torque, respectively, using a vehicle speed sensor, a steering angle sensor and a torque sensor, and generates a target assist torque of the motor based on the vehicle speed, the steering angle and the torque, thus assisting with the steering force.

However, in the conventional MDPS, if an error occurs in the torque sensor, a fail safe logic determines the degree of abnormality and, based on this, limits the output or converts the operating type into a manual type, whereby the steering operation may not be normally performed.

The related art of the present invention is disclosed in Korean Patent Publication No. 10-2008-0078428 (published on Aug. 27, 2008), entitled "Method of compensating for middle point of torque sensor of motor driven power steering system".

SUMMARY OF THE INVENTION

An embodiment of the present invention is directed to a motor driven power steering system and a method of controlling the same, in which when an error occurs in a torque sensor of the driven power steering system, a virtual torque is produced, and an assist torque is generated based on the virtual torque, thus making it possible to perform a normal steering operation.

An embodiment of the present invention is directed to a motor driven power steering system and a method of controlling the same, which continuously generates the assist torque even if an error occurs in the torque sensor, thus securing the driving stability of the vehicle.

In one embodiment, a motor driven power steering system may include: a steering angle sensor configured to sense a steering angle of a steering wheel; a motor current sensor configured to sense a current of a motor; an encoder configured to sense a position of the motor; a vehicle speed sensor configured to sense a speed of a vehicle; a virtual torque estimation unit configured to estimate, when an error of a torque sensor is detected, a virtual torque using the position of the motor, the steering angle of the steering wheel, and the current of the motor that are respectively sensed by the encoder, the steering angle sensor, and the motor current sensor; and an assist torque calculation unit configured to calculate an assist torque for operation of the motor using the steering angle of the steering wheel, the speed of the vehicle, and the virtual torque that are respectively inputted from the steering angle sensor, the vehicle speed sensor, and the virtual torque estimation unit.

The virtual torque estimation unit may include a virtual torque calculation unit configured to detect a steering angle speed, a motor angle, a current and an inertia moment using the position of the motor, the steering angle of the steering wheel and the current of the motor that are respectively sensed by the encoder, the steering angle sensor and the motor current sensor, and then calculate the virtual torque using the steering angle speed, the motor angle, the current and the inertia moment.

The virtual torque estimation unit may include a virtual torque compensation unit configured to compensate for the virtual torque outputted from the virtual torque calculation unit, depending on the steering angle speed.

The virtual torque compensation unit may reduce the virtual torque outputted from the virtual torque calculation unit as the steering angle speed is increased.

The assist torque calculation unit may include a boost curve control unit configured to adjust a boost curve for the virtual torque outputted from the virtual torque estimation unit, into a linear form, and restrain an oscillation phenomenon of the assist torque.

The assist torque calculation unit may include a high-frequency amplification rate control unit configured to amplify a high-frequency signal of the virtual torque at a preset amplification rate or disable the high-frequency signal, and restrain an oscillation phenomenon due to a noise of the virtual torque.

The motor driven power steering system may further include a motor controller configured to adjust a control gain depending on the assist torque outputted from the assist torque calculation unit, and control the current to be applied to the motor.

The motor driven power steering system may further include a torque sensor error detection unit, wherein the torque sensor error detection unit may compare the virtual torque with a detected torque detected by the torque sensor, and determine the error of the torque sensor if a difference between the virtual torque and the detected torque exceeds a reference value.

In another embodiment, a method of controlling a motor driven power steering system may include: estimating, by a virtual torque estimation unit, a virtual torque using a position of a motor, a steering angle of a steering wheel, and a current of a motor when an error of a torque sensor is detected; calculating, by an assist torque calculation unit, an assist torque for operation of the motor using the steering angle of the steering wheel, a speed of a vehicle, and the virtual torque estimated by the virtual torque estimation unit; and controlling, by a motor controller, a current to be applied to the motor depending on the assist torque calculated by the assist torque calculation unit.

The estimating of the virtual torque may include: calculating the virtual torque using a steering angle speed of the steering wheel, a motor angle of the motor, the current of the motor and an inertia moment; and compensating for the virtual torque depending on the steering angle speed.

As the steering angle speed is increased, the virtual torque may be reduced.

The detecting of the assist torque may include adjusting a boost curve for the virtual torque into a linear form, and restraining an oscillation phenomenon of the assist torque.

The detecting of the assist torque may include amplifying a high-frequency signal of the virtual torque at a preset amplification rate or disable the high-frequency signal, and restrain an oscillation phenomenon due to a noise of the virtual torque.

The controlling of the current to be applied to the motor may include adjusting a control gain depending on the assist torque, and controlling the current to be applied to the motor.

In a motor driven power steering system and a method of controlling the same in accordance with an embodiment of the present invention, when an error occurs in a torque sensor of the driven power steering system, a virtual torque is produced, and an assist torque is generated based on the virtual torque, thus making it possible to perform a normal steering operation.

In a motor driven power steering system and a method of controlling the same in accordance with another embodiment of the present invention, even if an error occurs in the torque sensor, the assist torque is continuously generated, thus securing the driving stability of the vehicle.

DESCRIPTION OF SPECIFIC EMBODIMENTS

Hereafter, a motor driven power steering system and a method of controlling the same in accordance with an embodiment of the invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
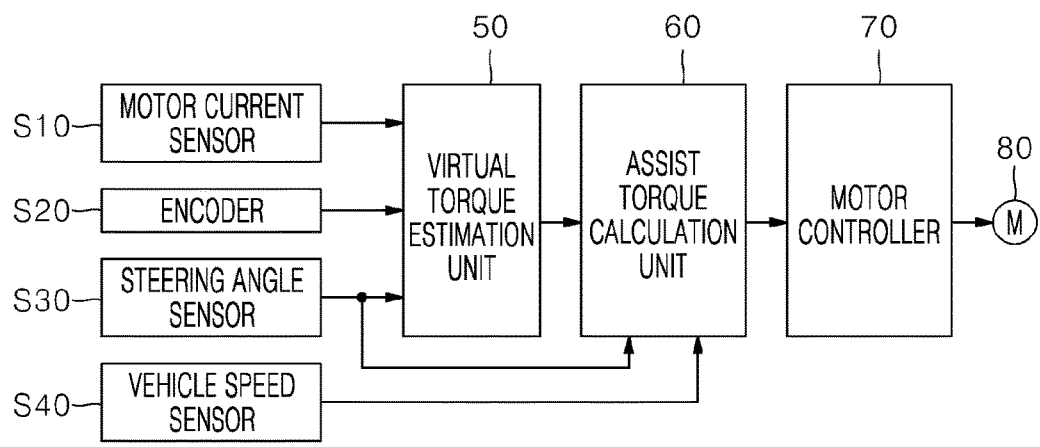
FIG. 1 is a block diagram illustrating a motor driven power steering system in accordance with an embodiment of the present invention.
Figure 2:
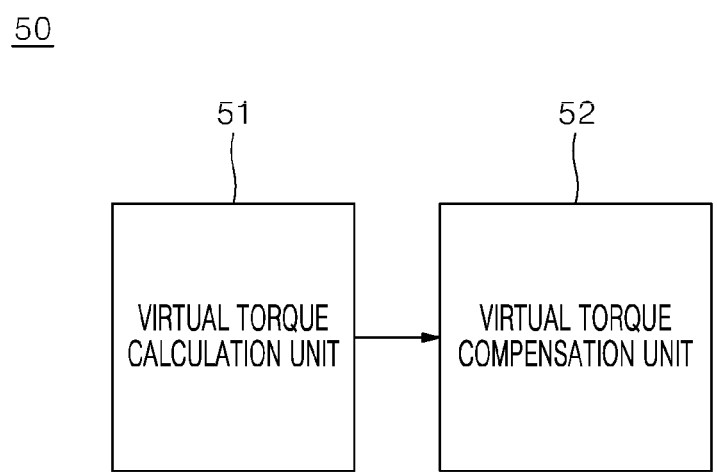
FIG. 2 is a block diagram illustrating a virtual torque estimation unit in accordance with an embodiment of the present invention.
Figure 3:
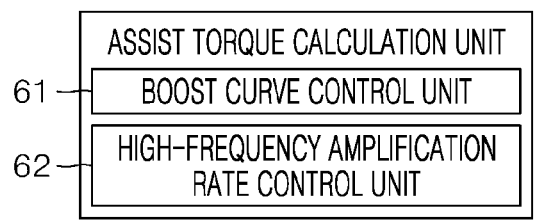
FIG. 3 is a block diagram illustrating an assist torque calculation unit in accordance with an embodiment of the present invention.
Figure 4:
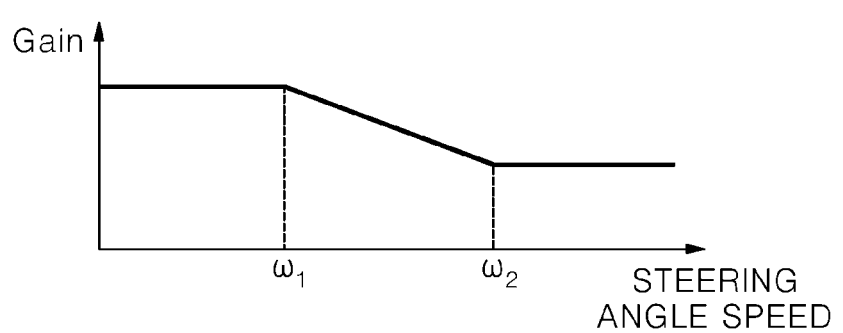
FIG. 4 is a diagram illustrating an example of a damping control operation for a virtual torque in accordance with an embodiment of the present invention.
Figure 5:
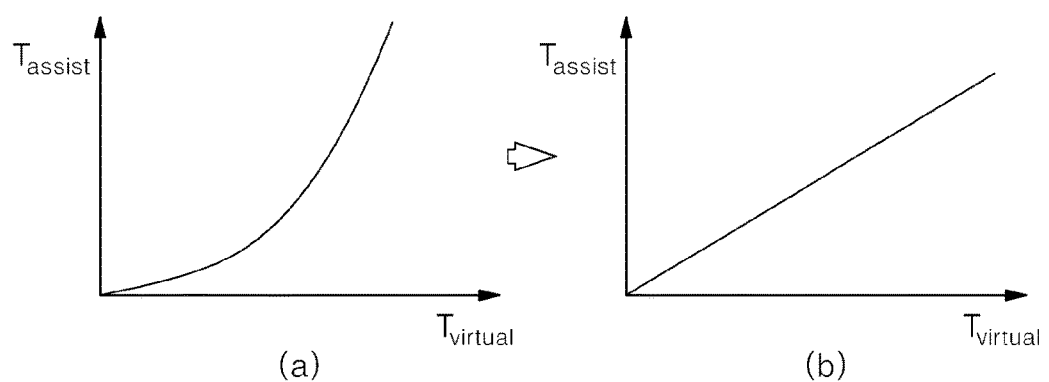
FIG. 5 is a diagram showing an example of adjustment in a boost curve in accordance with an embodiment of the present invention.

FIG. 1 is a block diagram illustrating a motor driven power steering system in accordance with an embodiment of the present invention, FIG. 2 is a block diagram illustrating a virtual torque estimation unit in accordance with an embodiment of the present invention, FIG. 3 is a block diagram illustrating an assist torque calculation unit in accordance with an embodiment of the present invention, FIG. 4 is a diagram illustrating an example of a damping control operation for a virtual torque in accordance with an embodiment of the present invention, and FIG. 5 is a diagram showing an example of adjustment in a boost curve in accordance with an embodiment of the present invention.

Referring to FIG. 1, a motor driven power steering system in accordance with an embodiment of the present invention includes a motor current sensor 10, an encoder 20, a steering angle sensor 30, a vehicle speed sensor 40, a virtual torque estimation unit 50, an assist torque calculation unit 60, and a motor controller 70.

The motor current sensor 10 senses a current flowing through a motor 80, in other words, senses motor Q-axis current and D-axis current.

The encoder 20 is installed on the motor 80 and senses a rotation angle of the motor 80.

The vehicle speed sensor 40 senses the speed of the vehicle using the RPM of an output shaft of a transmission (not shown). In this regard, the vehicle speed sensor 40 is not limited to that of the above-mentioned embodiment. Various sensors can be used as the vehicle speed sensor 40, so long as they can sense the speed of the vehicle.

The steering angle sensor 30 is installed on a steering column and configured to sense the steering angle of the steering column.

The virtual torque estimation unit 50 receives, when an error of a torque sensor (not shown) is detected, information about the position of the motor 80, the steering angle of the steering wheel and the current of the motor 80 from the encoder 20, the steering angle sensor 30 and the motor current sensor 10, respectively, and then estimates a virtual torque using them. The virtual torque estimation unit 50 includes a virtual toque calculation unit 51 and a virtual torque compensation unit 52.

The torque sensor functions to detect the steering torque and is necessarily used to generate an assist torque for driving the motor.

The virtual torque calculation unit 51 receives, when an error of the torque sensor is detected, information about the position of the motor 80, the steering angle of the steering wheel and the current of the motor 80 from the encoder 20, the steering angle sensor 30 and the motor current sensor 10, and estimates a virtual torque using them, wherein the virtual torque is calculated using a steering angle speed, a motor angle, the current, and the moment of inertia. This will be explained with reference to Equations 1 to 3.

$$F = \alpha\left(\frac{J}{2}(\dot{\theta}_{comp}^2 - \dot{\theta}_{motor}^2) - \beta\dot{\theta}_{avg}I - \gamma\dot{\theta}_{avg}\ddot{\theta}_{motor}\right) \quad \text{[Equation 1]}$$

$$\dot{\theta}_{comp} = \dot{\theta}_{SAS} - \dot{\theta}_{Linearity} - \dot{\theta}_{Initialize} \quad \text{[Equation 2]}$$

$$F = \dot{\theta}_{avg} \times \dot{T}_{virtual} \quad \text{[Equation 3]}$$

Here, $\theta_{SAS}$ denotes a steering angle, $\theta_{avg}$ denotes an average of the steering angle and a motor angle, $\theta_{Linearity}$ denotes a compensation angle provided to compensate for characteristics of the steering angle sensor, $\theta_{Initialize}$ denotes an initial value of the steering angle, $\theta_{comp}$ denotes a final compensation angle of the steering angle, $\theta_{motor}$ denotes a motor angle, J denotes the moment of inertia in the motor driven power steering system and is a constant, $T_{virtual}$ denotes a virtual torque, and $\alpha$, $\beta$ and $\gamma$ denote tuning gains.

First, the virtual torque calculation unit 51 multiplies the square ($\dot{\theta}_{comp}^2$) of a variation in the steering angle according to steering intention of a driver by the moment of inertia (J/2) and the tuning gain a, thus calculating the kinetic energy of the steering. A variation in the final compensation angle $\theta_{comp}$ of the steering angle is calculated using a variation $\theta_{SAS}$ in the steering angle, a variation $\dot{\theta}_{Linearity}$ in linearity of the steering angle, and a variation $\dot{\theta}_{Initialize}$ in initial value of the steering angle. The steering kinetic energy may be calculated to reflect the variation in the final compensation angle $\theta_{comp}$ of the steering angle.

Furthermore, the virtual torque calculation unit 51 calculates the kinetic energy to be generated by the rotation of the motor 80. That is, the virtual torque calculation unit 51 calculates the kinetic energy to be generated by the rotation of the motor 80, by multiplying the square ($\dot{\theta}_{motor}^2$) of a variation in the motor angle $\theta_{motor}$ by the moment of inertia (J/2) and the tuning gain $\alpha$.

In addition, the virtual torque calculation unit 51 calculates a steering direction, that is, a torque according to a current command. In other words, the virtual torque calculation unit 51 calculates a torque according to the steering direction by multiplying a variation $\dot{\theta}_{avg}$ in the average $\theta_{avg}$ of the steering angle and the motor angle by a variation $\dot{I}$ in the motor Q-axis current and the tuning gain $\beta$.

Furthermore, the virtual torque calculation unit 51 calculates a delay in calculation time between the steering angle and the motor position that is caused by a difference in calculation time between the steering angle and the motor position. That is, the virtual torque calculation unit 51 calculates the delay in calculation time between the steering angle and the motor position by multiplying the variation $\dot{\theta}_{avg}$ in the average $\theta_{avg}$ of the steering angle and the motor angle by an angular acceleration $\ddot{\theta}_{motor}$ of the motor 80 and the tuning gain $\gamma$.

After the virtual torque calculation unit 51 calculates the kinetic energy according to the steering intention of the driver, the kinetic energy to be generated by the rotation of the motor, the torque according to the steering direction, and the delay in calculation time between the steering angle and the motor position, the above-mentioned Equation 1 may be obtained.

In this regard, the square ($\dot{\theta}_{comp}^2$) of a variation in the steering angle is calculated through Equation 2. Nonlinearity of the steering angle sensor 30 may be improved through the square ($\dot{\theta}_{comp}^2$) of a variation in the steering angle.

Referring to Equations 1 and 3, the functions F are the same as each other. That is, the function F of Equation 3, in other words, a multiplication of the variation $\dot{\theta}_{avg}$ in the average $\theta_{avg}$ of the steering angle and the motor angle by a variation $\dot{T}$ in the virtual torque, is the same as the function F of Equation 1. Thereby, the variation $\dot{T}$ in the virtual torque can be calculated. In this case, the virtual torque calculation unit 51 calculates the variation $\dot{T}$ in the virtual torque using the two functions F, that is, the function F of Equation 1 and the function F of Equation 3, and calculates the virtual torque by integrating the calculated variation in the virtual torque.

The virtual torque compensation unit 52 compensates for the calculated virtual torque. In more detail, the virtual torque compensation unit 52 compensates for the virtual torque inputted from the virtual torque calculation unit 51, depending on the steering angle speed. As the steering angle speed is increased, a damping gain value is reduced so that the stability of the virtual torque can be enhanced. For example, as shown in FIG. 4, the virtual torque compensation unit 52 reduces the damping gain value in stages based on a first steering angle speed $\omega 1$ and a second steering angle speed $\omega 2$, thus restraining an oscillation phenomenon which may be caused when the driver rapidly steers the steering wheel (that is, when the steering angle speed is greatly increased).

The assist torque calculation unit 60 calculates an assist torque using the virtual torque inputted from the virtual torque estimation unit 50, the steering angle inputted from the steering angle sensor 30, and the vehicle speed inputted from the vehicle speed sensor 40.

As shown in FIG. 3, the assist torque calculation unit 60 includes a boost curve control unit 61 and a high-frequency amplification rate control unit 62.

The boost curve control unit 61 adjusts a boost curve for the virtual torque outputted from the virtual torque estimation unit 50, into a linear form, thus restraining an oscillation phenomenon attributable to the assist torque. That is, as shown in (a) of FIG. 5, if the assist torque is rapidly increased as a function of an increase in virtual torque, the stability of the system may be deteriorated. Given this, as shown in (b) of FIG. 5, as the linearity of the boost curve is secured, the stability of the system can be markedly enhanced.

The high-frequency amplification rate control unit 62 amplifies a high-frequency signal of the virtual torque at a relatively low preset amplification rate or disables the high-frequency signal, thus enhancing the stability of the system. That is, the high-frequency amplification rate control unit 62 relatively reduces or disables the amplification rate of the high-frequency signal of the virtual torque, thus restraining a noise signal from being amplified due to amplification of a high-frequency signal. Thereby, the stability of the system is secured. Moreover, because, as described above, the high-frequency amplification rate control unit 62 amplifies the high-frequency signal, the responsiveness of the system can be enhanced.

The motor controller 70 adjusts, depending on the assist torque outputted from the assist torque calculation unit 60, a corresponding current gain value, and thus controls a current to be applied to the motor 80, thereby securing the stability in steering. For example, in the case where the motor controller 70 is a PID (Proportional Integral and Derivative) controller, the motor controller 70 adjusts any one or more among a P gain, an I gain and a D gain depending on the assist torque inputted from the assist torque calculation unit 60, and thus controls a current to be applied to the motor 80.

Therefore, the motor 80 operates according to the current inputted from the motor controller 70, thus assisting with the steering force of the driver.

The motor driven power steering system further includes a torque sensor error detection unit (not shown). The torque sensor error detection unit compares the virtual torque with a detected torque detected by the torque sensor (not shown), and determines the error of the torque sensor if a difference between the virtual torque and the detected torque exceeds a reference value. In this case, the virtual torque estimation unit 50 may also estimate the virtual torque regardless of detection of the error of the torque sensor (i.e. also in a normal state).

Hereinbelow, a method of controlling the motor driven power steering system in accordance with an embodiment of the present invention will be described in detail with reference to FIG. 6.

Figure 6:
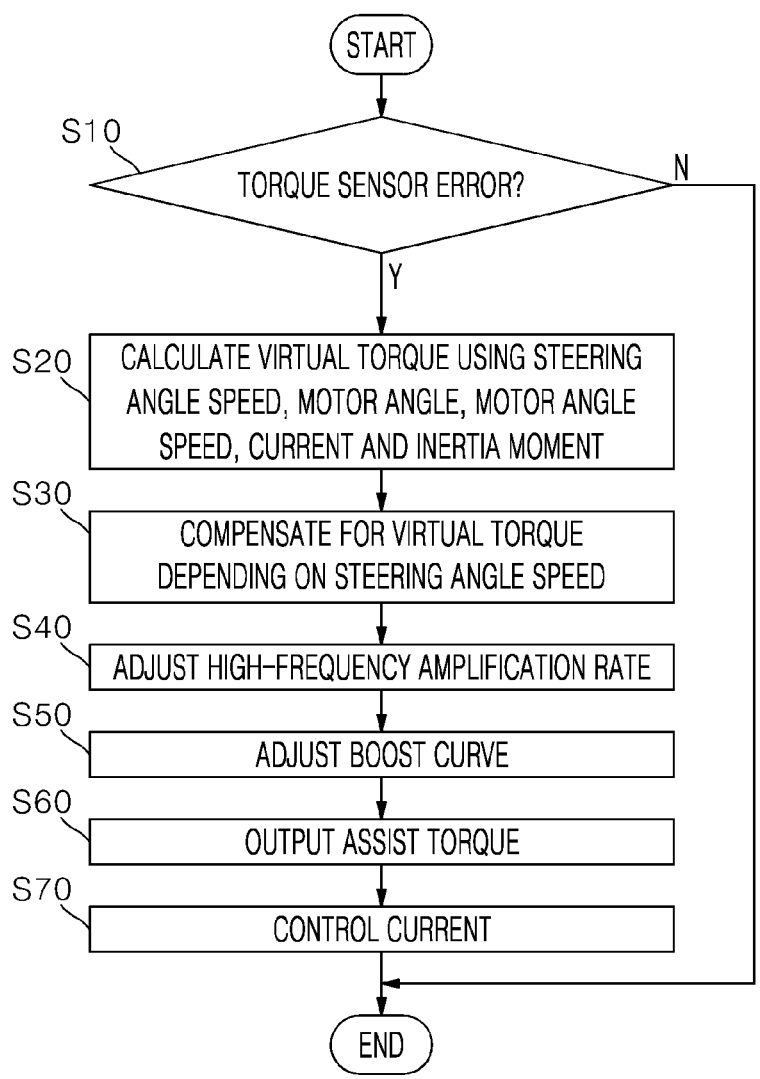
FIG. 6 is a flowchart showing a method of controlling the motor driven power steering system in accordance with an embodiment of the present invention.

FIG. 6 is a flowchart illustrating the method of controlling the motor driven power steering system in accordance with the embodiment of the present invention.

Referring to FIG. 6, the virtual torque estimation unit 50 or the torque sensor error detection unit(not shown) determines whether an error is detected in the torque sensor that senses the column torque (at S10). When, as a result of the determination, an error in the torque sensor is detected, the virtual torque estimation unit 50 receives information about the position of the motor 80, the steering angle of the steering wheel, and the current of the motor 80 from the encoder 20, the steering angle sensor 30 and the motor current sensor 10, respectively, and then estimates a virtual torque using the position of the motor 80, the steering angle of the steering wheel and the current of the motor 80.

That is, the virtual torque estimation unit 50 calculates the kinetic energy according to the steering intention of the driver, the kinetic energy to be generated by the rotation of the motor, the torque according to the steering direction, and the delay in calculation time between the steering angle and the motor position, respectively, using a variation in steering angle, a variation in motor angle, a variation in current, a motor angular acceleration, the moment of inertia, and a tuning gain, and then derives Equation 1 based on them.

In addition, because the function F of Equation 1 and the function F of Equation 3 are the same as each other, that is, because a multiplication of a variation $\dot{\theta}_{avg}$ in an average $\theta_{avg}$ of the steering angle and the motor angle by a variation $\dot{T}$ in the virtual torque is the same as the function F of Equation 1, the variation $\dot{T}$ in the virtual torque is calculated using the two functions F (the function F of Equation 1 and the function F of Equation 3), and the virtual torque is calculated by integrating the calculated variation in the virtual torque (at S20).

Thereafter, the virtual torque estimation unit 50 compensates for the virtual torque by reducing the damping gain value as the steering angle speed is increased (at S30). Thereby, an oscillation phenomenon which may be caused when the driver rapidly steers the steering wheel (that is, when the steering angle speed is greatly increased) may be restrained.

Subsequently, the assist torque calculation unit 60 calculates an assist torque using the virtual torque inputted from the virtual torque estimation unit 50, the steering angle inputted from the steering angle sensor 30, and the vehicle speed inputted from the vehicle speed sensor 40. In this regard, an amplification rate for a high-frequency signal of the virtual torque is adjusted (at S40), and a boost curve for the virtual torque is adjusted into a linear form (at S50), thus restraining an oscillation phenomenon attributable to the assist torque, and enhancing the stability of the system.

The assist torque calculation unit 60 outputs the assist torque detected in the above-mentioned manner, to the motor controller 70 (at S60). The motor controller 70 adjusts, depending on the assist torque inputted from the assist torque calculation unit 60, a corresponding control gain value and thus controls a current to be applied to the motor 80 (at S70).

Consequently, the motor 80 operates by the current inputted from the motor controller 70, thus assisting with the steering force of the driver.

As described above, a motor driven power steering system in accordance with an embodiment of the present invention produces, when an error occurs in a torque sensor of the motor driven power steering system, a virtual torque signal and generates an assist torque based on the virtual torque signal, thus making normal steering possible, thereby securing the driving stability of the vehicle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A motor driven power steering system comprising:
   a steering angle sensor configured to sense a steering angle of a steering wheel;
   a motor current sensor configured to sense a current of a motor;
   an encoder configured to sense a position of the motor;
   a vehicle speed sensor configured to sense a speed of a vehicle;
   a virtual torque estimation unit configured to estimate, when an error of a torque sensor is detected, a virtual torque using the position of the motor, the steering angle of the steering wheel, and the current of the motor that are respectively sensed by the encoder, the steering angle sensor, and the motor current sensor; and
   an assist torque calculation unit configured to calculate an assist torque for operation of the motor using the steering angle of the steering wheel, the speed of the vehicle, and the virtual torque that are respectively inputted from the steering angle sensor, the vehicle speed sensor, and the virtual torque estimation unit,
   wherein the assist torque calculation unit comprises a high-frequency amplification rate control unit configured to amplify a high-frequency signal of the virtual torque at a preset amplification rate or disable the high-frequency signal, and restrain an oscillation phenomenon due to a noise of the virtual torque,
   wherein the virtual torque estimation unit is further configured to detect a steering angle speed, wherein as the steering angle speed increases, the virtual torque estimation unit is configured to estimate the virtual torque by reducing a damping gain value.

2. The motor driven power steering system of claim 1, wherein the virtual torque estimation unit comprises:
   a virtual torque calculation unit configured to detect the steering angle speed, a motor angle, a current and an inertia moment using the position of the motor, the steering angle of the steering wheel and the current of the motor that are respectively sensed by the encoder, the steering angle sensor and the motor current sensor, and then calculate the virtual torque using the steering angle speed, the motor angle, the current and the inertia moment.

3. The motor driven power steering system of claim 2, wherein the virtual torque estimation unit comprises:
   a virtual torque compensation unit configured to compensate for the virtual torque outputted from the virtual torque calculation unit, depending on the steering angle speed.

4. The motor driven power steering system of claim 3, wherein the virtual torque compensation unit is configured to reduce the virtual torque outputted from the virtual torque calculation unit as the steering angle speed increases.

5. The motor driven power steering system of claim 1, wherein the assist torque calculation unit comprises:
   a boost curve control unit configured to adjust a boost curve for the virtual torque outputted from the virtual torque estimation unit, into a linear form, and restrain an oscillation phenomenon of the assist torque.

6. The motor driven power steering system of claim 1, further comprising:
a motor controller configured to adjust a control gain depending on the assist torque outputted from the assist torque calculation unit, and control the current to be applied to the motor.

7. A motor driven power steering system comprising:
a steering angle sensor configured to sense a steering angle of a steering wheel;
a motor current sensor configured to sense a current of a motor;
an encoder configured to sense a position of the motor;
a vehicle speed sensor configured to sense a speed of a vehicle;
a virtual torque estimation unit configured to estimate, when an error of a torque sensor is detected, a virtual torque using the position of the motor, the steering angle of the steering wheel, and the current of the motor that are respectively sensed by the encoder, the steering angle sensor, and the motor current sensor;
an assist torque calculation unit configured to calculate an assist torque for operation of the motor using the steering angle of the steering wheel, the speed of the vehicle, and the virtual torque that are respectively inputted from the steering angle sensor, the vehicle speed sensor, and the virtual torque estimation unit; and
a torque sensor error detection unit configured to compare the virtual torque with a detected torque detected by the torque sensor, and further configured to determine an error of the torque sensor if a difference between the virtual torque and the detected torque exceeds a reference value,
wherein the virtual torque estimation unit is further configured to detect a steering angle speed, wherein as the steering angle speed increases, the virtual torque estimation unit is configured to estimate the virtual torque by reducing a damping gain value.

8. A method of controlling a motor driven power steering system, comprising:
estimating, by a virtual torque estimation unit, a virtual torque using a position of a motor, a steering angle of a steering wheel, and a current of a motor when an error of a torque sensor is detected;
calculating, by an assist torque calculation unit, an assist torque for operation of the motor using the steering angle of the steering wheel, a speed of a vehicle, and the virtual torque estimated by the virtual torque estimation unit; and
controlling, by a motor controller, a current to be applied to the motor depending on the assist torque calculated by the assist torque calculation unit,
wherein estimating the virtual torque comprises detecting a steering angle speed of the steering wheel, wherein as the steering angle speed increases, the virtual torque is estimated by reducing a damping gain value,
wherein detecting the assist torque comprises amplifying a high-frequency signal of the virtual torque at a preset amplification rate or disable the high-frequency signal, and restrain an oscillation phenomenon due to a noise of the virtual torque.

9. The method of claim 8, wherein estimating the virtual torque comprises:
calculating the virtual torque using the steering angle speed of the steering wheel, a motor angle of the motor, the current of the motor and an inertia moment; and
compensating for the virtual torque depending on the steering angle speed.

10. The method of claim 9, wherein as the steering angle speed is increased, the virtual torque is reduced.

11. The method of claim 8, wherein calculating the assist torque comprises:
adjusting a boost curve for the virtual torque into a linear form, and restraining an oscillation phenomenon of the assist torque.

12. The method of claim 8, wherein controlling the current to be applied to the motor comprises:
adjusting a control gain depending on the assist torque, and controlling the current to be applied to the motor.

* * * * *